(12) United States Patent
Xi et al.

(10) Patent No.: US 10,901,533 B2
(45) Date of Patent: Jan. 26, 2021

(54) REAL HANDWRITING STYLUS AND A TOUCH DEVICE

(71) Applicant: GUANGDONG ZONGHUA TOUCH CONTROL TECHNOLOGY CO. LTD., Guangdong (CN)

(72) Inventors: Bangzi Xi, Dongguan (CN); Dezhong Zhu, Dongguan (CN)

(73) Assignee: GUANGDONG ZONGHUA TOUCH CONTROL TECHNOLOGY CO LTD., Dongguan (CN)

( * ) Notice: Subject to any disclaimer, the term of this patent is extended or adjusted under 35 U.S.C. 154(b) by 125 days.

(21) Appl. No.: 15/566,186

(22) PCT Filed: Nov. 28, 2016

(86) PCT No.: PCT/CN2016/107428
§ 371 (c)(1),
(2) Date: Oct. 12, 2017

(87) PCT Pub. No.: WO2017/185734
PCT Pub. Date: Nov. 2, 2017

(65) Prior Publication Data
US 2018/0267634 A1    Sep. 20, 2018

(30) Foreign Application Priority Data
Apr. 28, 2016 (CN) .......................... 2016 1 0272435

(51) Int. Cl.
*G06F 3/0354* (2013.01)
*G06F 3/041* (2006.01)
(Continued)

(52) U.S. Cl.
CPC ........ *G06F 3/03545* (2013.01); *G06F 3/0383* (2013.01); *G06F 3/0414* (2013.01);
(Continued)

(58) Field of Classification Search
CPC ............. G06F 3/03545; G06F 3/04883; G06F 3/0383; G06F 3/0414; G06F 3/0416; G06F 2203/04106; G06F 3/046; G06F 3/044
See application file for complete search history.

(56) References Cited

U.S. PATENT DOCUMENTS 4,672,154 A * 6/1987 Rodgers .............. G06F 3/03545
178/19.07
5,644,108 A * 7/1997 Katsurahira ........ G06F 3/03545
178/18.07
(Continued)

FOREIGN PATENT DOCUMENTS

CN    102602200 B    7/2013
CN    104423756 A    3/2015
(Continued)

OTHER PUBLICATIONS

Mar. 1, 2017 International Search Report issued in International Patent Application No. PCT/CN2016/107428.
(Continued)

*Primary Examiner* — Benyam Ketema

(57) ABSTRACT

A real handwriting stylus and a touch device, the stylus possesses multiple touch modes, it includes an electromagnetic mode stylus, a first capacitive mode stylus, a second capacitive mode stylus, a third capacitive mode stylus, a first electromagnetic and capacitive dual modes stylus, a second electromagnetic capacitive dual modes stylus and a third electromagnetic and capacitive dual modes stylus. The touch device possesses multiple stylus function modes and touch modules, and it includes an electromagnetic mode touch device, a first capacitive mode touch device, a second capacitive mode touch device, a third capacitive mode touch device, a first electromagnetic and capacitive dual modes touch device, a second electromagnetic and capacitive dual
(Continued)

modes touch device and a third electromagnetic and capacitive dual modes touch device.

20 Claims, 6 Drawing Sheets

(51) Int. Cl.
    *G06F 3/044*     (2006.01)
    *G06F 3/038*     (2013.01)
    *G06F 3/0488*     (2013.01)
    *G06F 3/046*     (2006.01)

(52) U.S. Cl.
    CPC ........ *G06F 3/0416* (2013.01); *G06F 3/04883* (2013.01); *G06F 3/044* (2013.01); *G06F 3/046* (2013.01); *G06F 2203/04106* (2013.01)

(56) References Cited

U.S. PATENT DOCUMENTS

| | | | | |
|---|---|---|---|---|
| 5,682,019 | A * | 10/1997 | Katsurahira | G06F 3/046 178/18.07 |
| 5,729,251 | A * | 3/1998 | Nakashima | G06F 3/03545 345/156 |
| 9,195,351 | B1 * | 11/2015 | Rosenberg | G06F 1/1626 |
| 2005/0043918 | A1 * | 2/2005 | Katsurahira | G06F 1/3203 702/178 |
| 2005/0122319 | A1 * | 6/2005 | Sakurai | G06F 3/03545 345/179 |
| 2005/0128191 | A1 * | 6/2005 | Katsurahira | G06F 1/3203 345/179 |
| 2007/0014490 | A1 * | 1/2007 | Silverbrook | B41J 2/17503 382/313 |
| 2007/0025805 | A1 * | 2/2007 | Lapstun | B43K 7/005 401/195 |
| 2007/0046649 | A1 * | 3/2007 | Reiner | G06F 3/03545 345/173 |
| 2008/0055279 | A1 * | 3/2008 | Osada | G06F 3/03545 345/179 |
| 2009/0079710 | A1 * | 3/2009 | Lapstun | B41J 2/17503 345/179 |
| 2012/0223917 | A1 * | 9/2012 | Lin | G06F 3/03545 345/179 |
| 2012/0268428 | A1 * | 10/2012 | Nakata | G06F 3/044 345/179 |
| 2014/0104187 | A1 * | 4/2014 | Bakken | G06F 3/044 345/173 |
| 2014/0247238 | A1 | 9/2014 | Chang | |
| 2015/0070330 | A1 * | 3/2015 | Stern | G06F 3/03545 345/179 |
| 2015/0293627 | A1 * | 10/2015 | Park | G06F 3/044 345/174 |
| 2015/0378453 | A1 * | 12/2015 | Wu | G06F 3/044 345/179 |
| 2016/0188009 | A1 * | 6/2016 | Katsurahira | G06F 3/046 345/179 |
| 2018/0046249 | A1 * | 2/2018 | Peretz | G06F 3/03545 |

FOREIGN PATENT DOCUMENTS

| | | |
|---|---|---|
| CN | 104461078 A | 3/2015 |
| CN | 104516598 A | 4/2015 |
| CN | 105607766 A | 5/2016 |
| CN | 105867711 A | 8/2016 |
| CN | 105929985 A | 9/2016 |
| CN | 205721670 U | 11/2016 |
| CN | 205750759 U | 11/2016 |
| CN | 205788112 U | 12/2016 |

OTHER PUBLICATIONS

Mar. 1, 2017 Written Opinion issued in International Patent Application No. PCT/CN2016/107428.

* cited by examiner

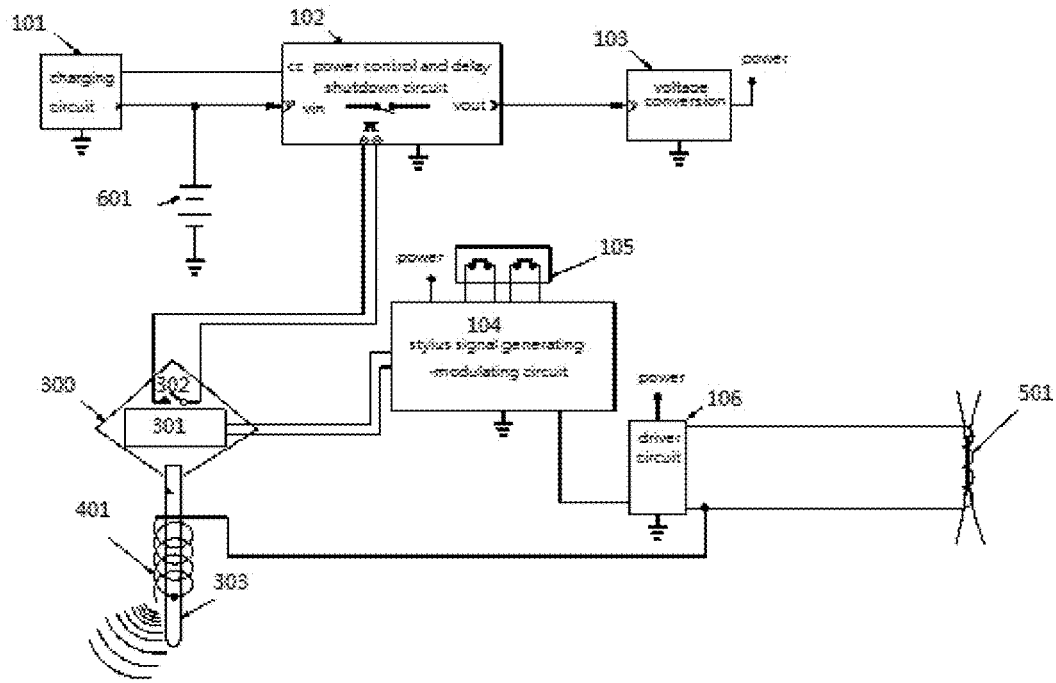
Fig. 1
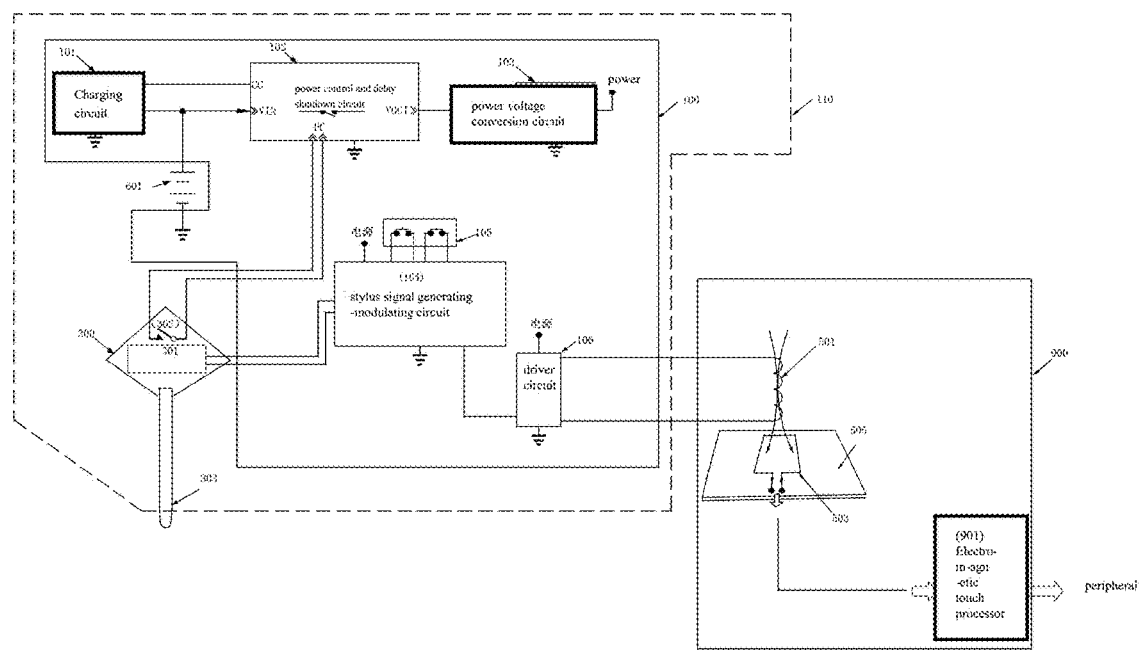
Fig. 2.1

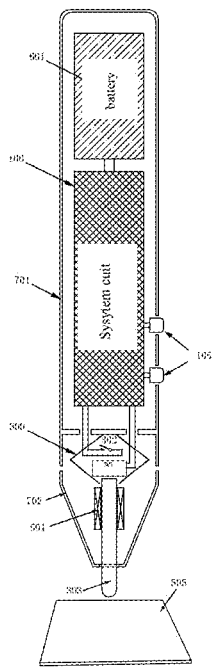
Fig. 2.2
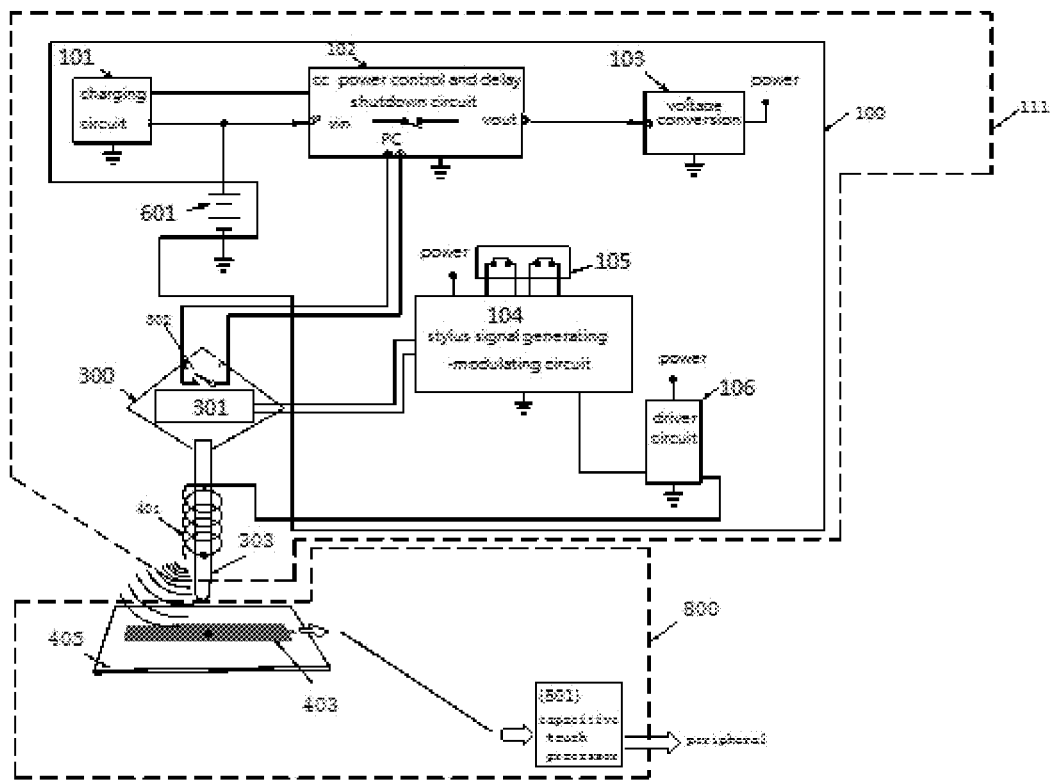
Fig. 3.1

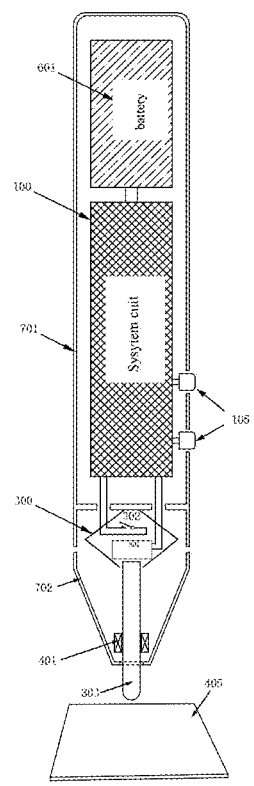
Fig.3.2
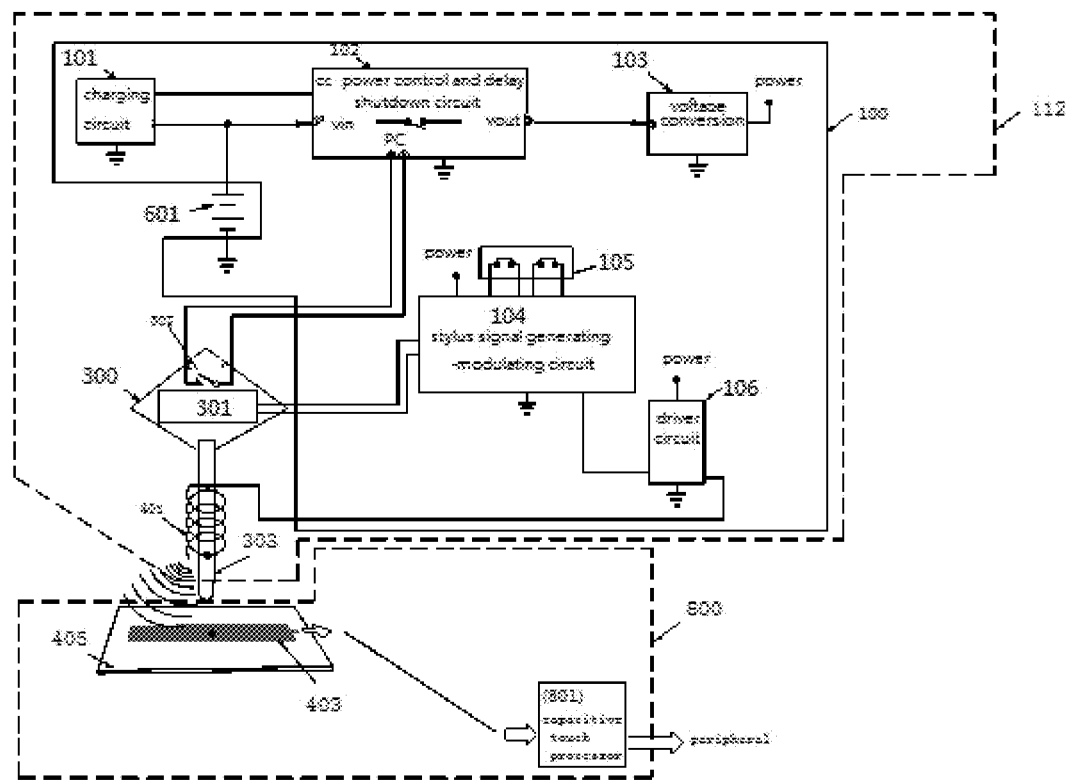
Fig.4.1

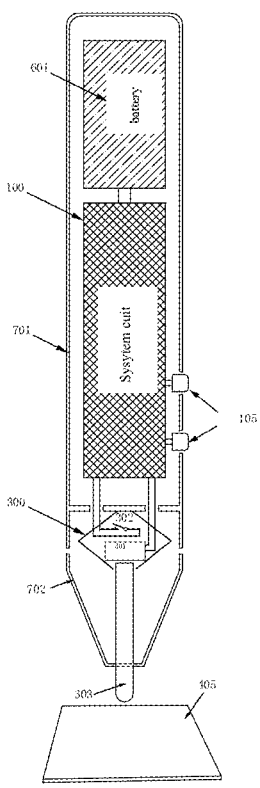
Fig. 4.2

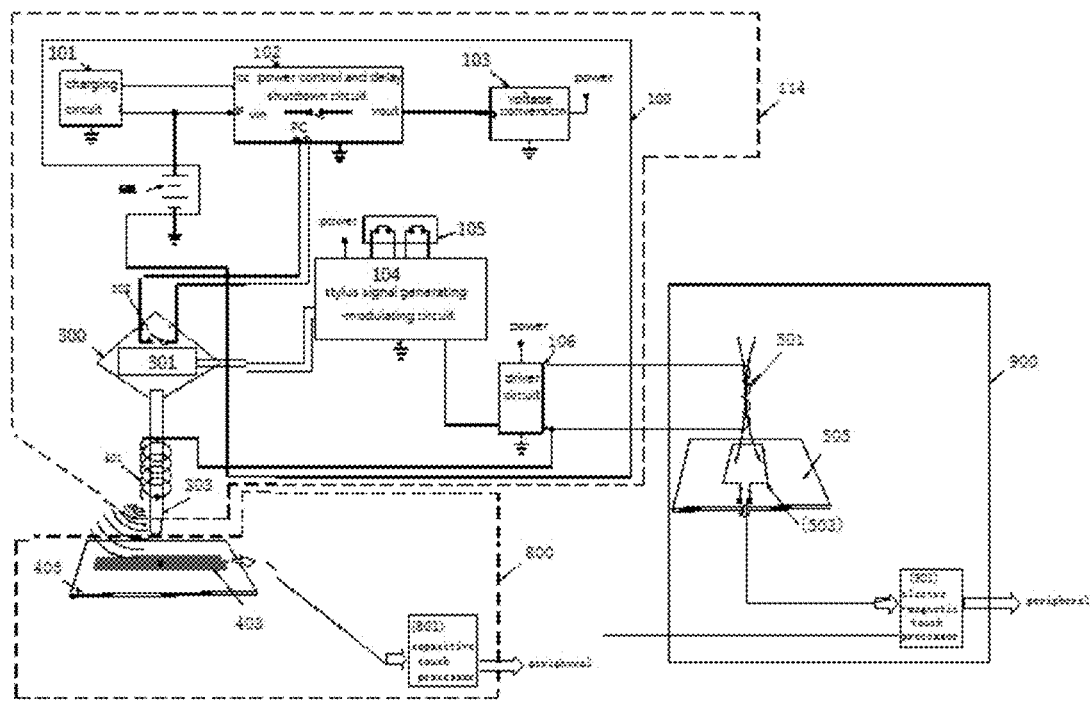
Fig. 5.1
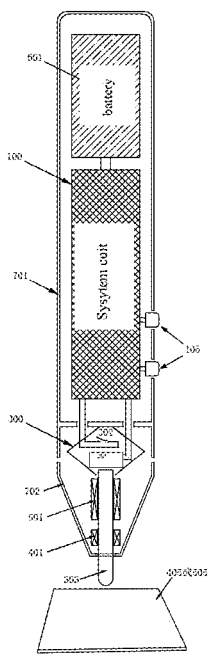
Fig. 5.2

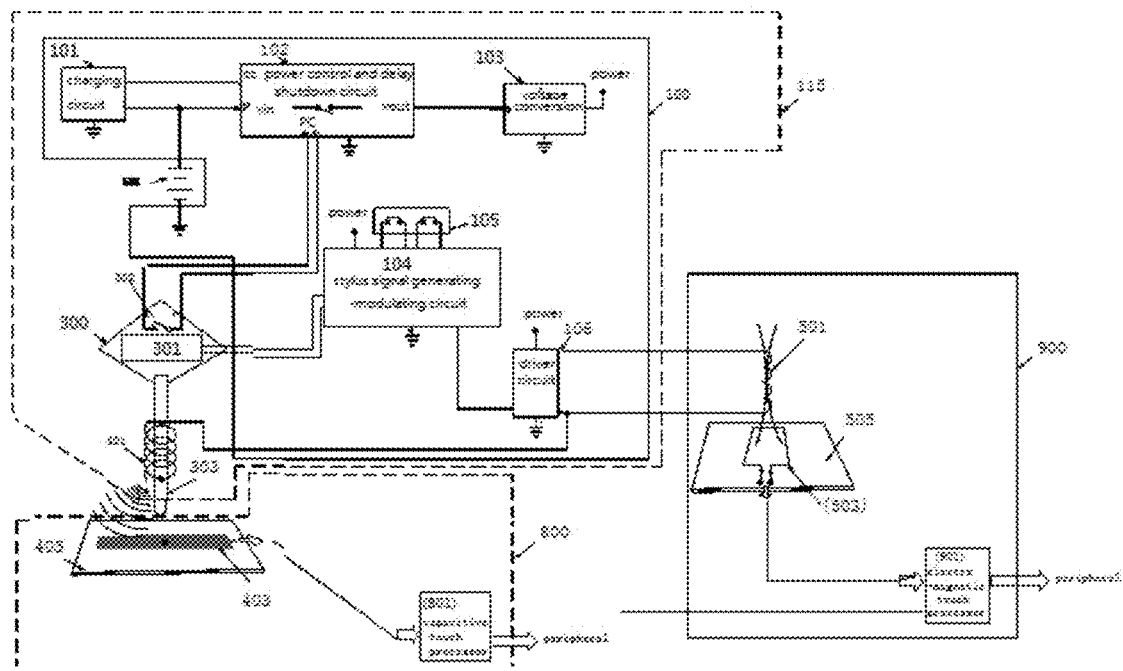
Fig. 6.1
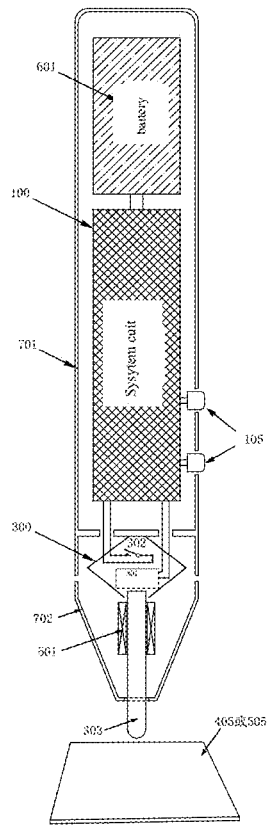
Fig. 6.2

REAL HANDWRITING STYLUS AND A TOUCH DEVICE

FIELD OF TECHNOLOGY

This invention relates to a stylus; especially related to a real handwriting stylus and a touch device which possesses electromagnetic touch mode, capacitive touch mode, and electromagnetic and capacitive dual modes and records the real handwriting of the writer.

BACKGROUND TECHNOLOGY

With the progress and development of electronic products, the application of inductor become very extensive. At present, the inductor has two modes: the capacitive mode and the electromagnetic mode, it achieve handwriting input function via making the touch handwriting stylus keep in touch with the touch-induced active zone of the touch inductor of the touch handwriting input device.

In the application CN200810089922 "capacitive stylus" discloses a capacitive stylus, it includes a conducting plate, a connector and a conducting stylus body, the connector connecting the conducting plate with the stylus body, whereby the stylus body and the conducting plate takes relative motion. Since the connector causes inconvenient operation; and the existing stylus achieves the simple handwriting function via electric circuits, with no writing pressure induction function, which cannot output different pressure signals according to the value of the pressure applied to the stylus, which leads to single function and simple output; or, although it maybe have stylus pressure detecting function, is long in pressure detecting distance, poor in writing experience, complicated in implementation and high in cost. Moreover it cannot mirror the handwriting characteristic of the writer accurately.

Furthermore, the exiting stylus usually adopts single mode, and cannot adopt combination of both capacitive mode and electromagnetic mode inductor, and is suitable for the capacitive mode and electromagnetic mode inductor only.

SUMMARY OF THE INVENTION

In order to overcome these disadvantages, the present invention provides a real handwriting stylus and a touch device, which includes an electromagnetic stylus with an electromagnetic mode, a capacitive mode or electromagnetic and capacitive dual modes, and can suit to the capacitive inductor or the electromagnetic inductor, or the both, it also possess a real handwriting function with writing pressure induction.

The present invention provides a real handwriting stylus, includes multiple modes touch function, such as an electromagnetic mode stylus, a first capacitive mode stylus, a second capacitive mode stylus, a third capacitive mode stylus, a first electromagnetic and capacitive dual mode stylus, a second electromagnetic and capacitive dual mode stylus as well as a third electromagnetic and capacitive dual modes stylus. Specifically, the technical solution of the present invention is as follows:

A real handwriting stylus, includes a stylus shell, a battery inside the stylus shell, a stylus system circuit insides the stylus shell and touch pressure-sensitive components inside the stylus shell, wherein the touch pressure-sensitive components includes a nib, a nib touch switch and a nib pressure sensor;

the stylus system circuit includes a charging circuit, a power control and a shutdown delay circuit, a power voltage conversion circuit, function keys, a stylus signal generating-modulating circuit and a driver circuit;

the power voltage conversion circuit is connected with the power control and shutdown delay circuit to convert the system power supply into constantly operating supply voltage;

the stylus signal generating-modulating circuit is connected with the nib pressure sensor and the function keys, whereby obtaining nib pressure signals and function key signals separately, and modulating the signals to output the stylus modulating signals;

the driver circuit is connected with a stylus signal generating-modulating circuit to obtain stylus modulating signals, upon driven and amplified by the driver circuit, thereby outputting electromagnetic signal and/or electrical signals.

Preferably, the nib pressure sensor is a pressure sensitive resistor.

Preferably, the nib pressure sensor is a pressure sensitive capacitor.

Preferably, the stylus shell includes a stylus housing front-end and a stylus housing rear-end;

a battery and a stylus system circuit is arranged inside the stylus housing rear-end, the stylus housing rear-end is metal conductive material;

the touch pressure-sensitive components is arranged inside the stylus housing front-end, the stylus housing front-end is insulating material.

Preferably, the driver circuit connects with an electromagnetic signal output coils and outputs alternating electromagnetic signal, the electromagnetic signal output coils are toroidal coils winded with a metal wire with an insulating surface.

Preferably, the driver circuit connects with an electrical signal radiating antenna and outputs electric signal, the electric signal radiating antenna is an electric conductor which is made from a section of conductive material.

Preferably, the driver circuit connects with electric signal radiating antenna and outputs electrical signals, that is to say the nib is made from conductive material.

Preferably, the nib touch generates pressures which transfer to the nib touch switch and the nib pressure sensor.

Preferably, the power control and shutdown delay circuit of the stylus system circuit is arranged with a power input port connecting with the battery, a power output port connecting with the power voltage conversion circuit, a touch switching signal control port connecting with the nib touch switch; the touch switching signal control port connects with the touch switch and acquires signal, upon the conducted signal of the touch switch has been acquired, the power input port and power output port will be conducted to each other, and the stylus system circuit will enter a working condition; if the short circuit conducted signal connecting with the touch switch have not been received in the working condition for a long time, the connection between the power input port and the power output port will be cut off from each other, and the system circuit enters the shutdown status;

Preferably, the power control and shutdown delay circuit of the stylus system circuit also provides a power charging control port connecting with the charging circuit, it will enter a charging status upon the power charging control port have acquired charging signals, the connection between the power input port and the power output port will be cut off from each other, and the stylus system circuit will be locked in the shutdown status.

The present invention also provides a touch device, the touch device includes multiple stylus modules and touch modules, such as an electromagnetic mode touch device, a first capacitive mode touch device, a second capacitive mode touch device, a third capacitive mode touch device, a first electromagnetic and capacitive dual modes touch device, a second electromagnetic and capacitive dual modes touch device as well as a third electromagnetic and capacitive dual modes touch device, the details of the technology solution is as follows:

The touch device includes the real handwriting stylus and the touch modules, and the touch modules include touch inductors and touch processors, which receive the output electromagnetic signals and/or electrical signals from the real handwriting stylus.

Preferably, the touch module is an electromagnetic touch module, the electromagnetic touch module includes electromagnetic touch inductor and electromagnetic touch processor.

Preferably, the touch module is an capacitive touch module, the capacitive touch module includes capacitive touch inductor and capacitive touch processor.

Preferably, the touch module is an electromagnetic and capacitive dual module, an electromagnetic and capacitive dual module includes an electromagnetic module and a capacitive module; the electromagnetic module includes an electromagnetic touch inductor and an electromagnetic touch processor, the capacitive module includes a capacitive touch inductor and a capacitive touch processor.

Preferably, the capacitive touch inductor antenna unit of the capacitive touch inductor receives the electrical signals which is generated by the real handwriting stylus via the electric signal radiating antenna, then the electrical signals convert to field-induced signals and are input into the capacitive touch processor, the capacitive touch processor demodulates the signals to be recognized by an external device and transmits the signals to the external device.

Preferably, the electromagnetic touch inductor antenna unit of the electromagnetic touch inductor of the electromagnetic touch module receives alternating electromagnetic signals generated by the electromagnetic mode stylus via the electromagnetic output coils, then the alternating electromagnetic signals are converted to the electromagnetic inductive signals and input into the electromagnetic touch processor, the electromagnetic touch processor demodulates the signals to be recognized by an external device and transmits the signals to the external device.

Preferably, the electromagnetic touch inductor antenna unit of the electromagnetic touch module in the electromagnetic and capacitive dual module and the capacitive touch inductor antenna unit of the capacitive touch module acquire alternating electromagnetic signals and electrical signals respectively; the electromagnetic touch inductor antenna unit converts alternating electromagnetic signals into electromagnetic inductive signals, then the electromagnetic inductive signals are input into the electromagnetic touch processor, the electromagnetic touch processor demodulates the signals to be recognized by an external device and transmits the signals to the external device. the capacitive touch inductor antenna unit converts the electrical signals into field-induced signals and the field-induced signals are input into the capacitive touch processor, and the capacitive touch processor demodulates the signals to be recognized by an external device and transmits the signals to the external device.

Preferably, the electromagnetic touch module of the electromagnetic and capacitive dual touch module is arranged in the rear of the capacitive touch module, the electromagnetic touch processor transmit a shutdown signal of the capacitive touch module to the capacitive touch processor, whereby keeping the electromagnetic touch mode prior.

Preferably, the capacitive touch module of the electromagnetic and capacitive dual touch module is provided in the rear of the electromagnetic touch module, the capacitive touch processor transmits a shutdown signal of the electromagnetic touch module to the electromagnetic touch processor, whereby keeping the capacitive touch mode prior.

Preferably, signals recognized by an external device include nib suspended position signals, writing trace signals, stylus pressure signals, and function key signals.

Preferably, the external device is a capacitive touch inductor, an electromagnetic touch inductor, and computer and/or cellphone.

Compared with existing techniques, the real handwriting stylus and the touch device described in the present invention have following beneficial effects:

1) the real handwriting stylus and the touch device provided in the present invention possess multiple modes touch function, such as the electromagnetic mode, capacitive mode as well as the electromagnetic and capacitive dual modes, and can adapt to capacitive inductor and electromagnetic inductor.

2) While writing with the real handwriting stylus and the touch device described in the present invention, it outputs signals with different pressure based on the input pressure values applied on the stylus, thus generating the real handwriting of the writer.

3) With the real handwriting stylus described in the present invention, the signals of nib pressure and function key can be received more sensitively, and with the modulating circuit, it can demodulate the electromagnetic signals and/or electrical signals then transmit the signals to the corresponding touch module correctly and timely, and finally it can output accurate signals correctly and timely which real-time reflect the real handwriting of the writer.

4) the real handwriting stylus and touch device described in the present invention are easy to operate, have stylus pressure detecting function, with good experience in writing, easy implementation, and can mirror the handwriting characteristic of the writer accurately.

BRIEF DESCRIPTION OF THE DRAWINGS

FIG. 1 shows a circuit diagram of the real handwriting stylus of the embodiment of the invention.

FIG. 2.1 shows a structure diagram of the electromagnetic touch device of the embodiment of the invention.

FIG. 2.2 shows a circuit diagram of the electromagnetic touch device of the embodiment of the invention.

FIG. 3.1 shows a structure diagram of the first capacitive touch device of the embodiment of the invention.

FIG. 3.2 shows a circuit diagram of the first capacitive touch device of the embodiment of the invention.

FIG. 4.1 shows a structure diagram of the second capacitive touch device of the embodiment of the invention.

FIG. 4.2 shows a circuit diagram of the second capacitive touch device of the embodiment of the invention.

FIG. 5.1 shows a structure diagram of the first electromagnetic and capacitive touch device of the embodiment of the invention.

FIG. 5.2 shows a circuit diagram of the first electromagnetic and capacitive touch device of the embodiment of the invention.

FIG. 6.1 shows a structure diagram of the second electromagnetic and capacitive touch device of the embodiment of the invention.

FIG. 6.2 shows a circuit diagram of the second electromagnetic and capacitive touch device of the embodiment of the invention.

EMBODIMENTS

The technical solutions of examples of the present application are described clearly and completely as follows. Obviously, the described examples are just some not all examples of the present application. The protection scope of the present application is not defined by examples of the present application provided below. In contract, they are just selected examples of the present application. Based on examples of the present application, other examples that can be obtained by those skilled in the art without paying any creative work belong to the protection scope of the present application.

Example 1

The real handwriting stylus disclosed herein includes a stylus shell, a battery inside the stylus shell, a stylus system circuit 100 inside the stylus shell and a touch pressure-sensitive components 300 inside the stylus shell, and the stylus shell includes stylus housing front-end and a stylus housing rear-end; a battery 601 and a stylus system circuit 100 are provided inside the stylus housing rear-end, the stylus housing rear-end is made from metal conductive material; a touch pressure-sensitive component 300 is provided inside the stylus housing front-end, the stylus housing front-end is made from insulating material.

FIG. 1 shows a circuit diagram of the real handwriting stylus of the embodiment of the invention. The stylus system circuit 100 includes a power charging circuit 101, a power control and shutdown delay circuit 102, a power voltage conversion circuit 103, a function key 105, a stylus signal generating-modulating circuit 104 and a driver circuit 106; and the touch pressure-sensitive component 300 includes a nib 303, a nib touch switch 302 and a nib pressure sensor 301.

The nib pressure sensor 301 is a pressure sensitive resistor or a pressure sensitive capacitor, while writing with the stylus, the nib 303 of the touch pressure-sensitive component 300 of the stylus touches and generates touch pressure, the touch pressure is transmitted to the nib touch switch 302, and the touch pressure transmitted to the nib will touches the nib touch switch 302, whereby making the nib touch switch 302 is conducted to each other; and the nib touch pressure is transmitted to the nib pressure sensor 301 simultaneously, thereby the resistance value or capacitance value of the nib pressure sensor 30 is changed accordingly with the change of value of the touch pressure of the nib.

The battery 601 is a removable and disposable battery and/or rechargeable battery, in the present embodiment, the battery 601 at least includes a rechargeable battery, the charging circuit 101 may be a contact wired charging circuit, also a non-contact wireless charging circuit. The power voltage conversion circuit 103 is connected with the power control and shutdown delay circuit 102, whereby converting the system power supply to constant operating supply voltage.

The power control and shutdown delay circuit 102 is provided with a power input port VIN connecting with the battery, a power output port VOUT connecting with the power voltage conversion circuit 103, a touch switching signal control port PC connecting with the nib touch switch 302; a touch switching signal control port PC connecting with the touch switch 302 and acquiring switching signals, upon the conducted signal of the touch switch 302 is acquired, the power input port VIN and the power output port VOUT will be conducted to each other, and the stylus system circuit 100 starts to supply power and enter working condition; while the conducted signal connecting with the touch switch 302 has not received for a long time in the working condition, the connection between the power input port VIN and the power output port VOUT will be cut off from each other, and the stylus system circuit 100 will enter a power off status.

The power control and shutdown delay circuit 102 are also provided with the power charging control port CC connected with the charging circuit 101, while the power charging control port CC has acquired charging signals and enter a charging status, the connection between the power input port VIN and the power output port VOUT will be cut off from each other, and the stylus system circuit 100 will be locked in a power off status for power charging.

The stylus signal generating-modulating circuit 104 is connected with the nib pressure sensor 301 and the function keys 105, the function keys 105 are one or more keys, there are two keys K1 and K2 in the present embodiment. The stylus signal generating-modulating circuit 104 is used for generating modulating signals, it modulates the pressure sensitive resistor signals or the pressure sensitive capacitive signals acquired from the nib pressure sensor 301 as well as the function key signals acquired from the function keys 105 and outputs to stylus modulating signals.

The driver circuit 106 is connected with the stylus signal generating-modulating circuit 104 to acquire stylus modulating signals, upon driving and amplifying by the driver circuit 106, it outputs electromagnetic signals, electrical signals or electromagnetic-electrical signals, the driver circuit 106 outputs alternating electromagnetic signals via connecting with the electromagnetic signal output coils 501, and the driver circuit 106 outputs electrical signals via connecting with the electric signal radiating antenna 401.

The electromagnetic signal output coils 501 are toroidal coils tightly winding with at least one layer of metal wires for multiple turns, the metal wires can be enameled copper wires or silver wires, also can be cotton covered copper wires or silver wires. A magnetic core may be arranged in the coil to reduce the volume of the electromagnetic signal output coil 501 and increase the signal output intensity and output efficiency of the electromagnetic signal output coil 501. The annular electromagnetic signal output coils 501 is arranged around the nib inside the stylus housing front-end;

The electric signal radiating antenna 401 is a section of arbitrarily shaped electric conductor, it can be a annular metal, conductive rubber or a section of frizzy wire, and it is arranged around the nib 303 inside the stylus housing front-end;

The nib 303 made from the conductive materials may also be used as the electric signal radiating antenna 401, such that there is no need to specially provide a conductor as the electric signal radiating antenna, thus reducing components and volume, and saving costs;

On the base that the nib 303 made from the conductive materials is used as the electric signal radiating antenna 401, meanwhile, another section of electric conductor used as the electric signal radiating antenna, is provided to be connected with the nib 303. In this configuration, the electric signal outputs are more accurate, and the sensitivity of stylus are enhanced.

The stylus finally outputs the signals to an external device through electrical signals and/or electromagnetic signals based on the pressures on the stylus and track in use, the function keys 105 on the external ends can be defined as having any function, if the external device is a laptop, the key can be defined as left/right mouse button, the key can also be defined as the start key for APP, drawing erasing key, picture zoom shortcut key, screenshot shortcut key, etc.

As the stylus signal generating-modulating circuit 104 and the driver circuit 106 can accurate and timely modulate the electromagnetic signals and/or electrical signals to the corresponding touch modules, and finally output the accurate pressure and function key signals accurate and timely, the real handwriting stylus provided in the present invention can receive the nib pressure and function key signals more sensitively, and it real-time reflects the real handwriting of the writer.

If the driver circuit 106 only provides the electromagnetic output coils 501, and can only output the electromagnetic signals, the real handwriting stylus is an electromagnetic mode stylus 110;

If driver circuit 106 only provides an electrical signal radiating antenna 401, and can only output electrical signals, and the electric signal radiating antenna 401 is made from a section of arbitrary shaped electric conductor, the real handwriting stylus is the first capacitive mode stylus 111;

If the driver circuit 106 only provides electrical signal radiating antennas 401, and can only output electrical signals, and the nib 303 made from conductive material is also used as the electric signal radiating antenna 401, the real handwriting stylus is the second capacitive mode stylus 112;

If the driver circuit 106 only provides electric signal radiating antenna 401, and can only output electrical signals, and the nib 303 made from conductive material is also used as electric signal radiating antenna 401, meanwhile another section of electric conductor is also used as electrical signal radiating antenna and connected with the nib 303, the real handwriting stylus is the third capacitive mode stylus 113;

If the driver circuit 106 both provides the electromagnetic output coils 501 and the electrical signal radiating antenna 401, and it outputs electromagnetic signals and electrical signals, the electric signal radiating antenna 401 is made from a section of arbitrary shaped electric conductor, the real handwriting stylus is the first electromagnetic and capacitive dual mode stylus 114;

If the driver circuit 106 both provides the electromagnetic output coils 501 and the electric signal radiating antenna 401, and it outputs electromagnetic signals and electrical signals, the nib 303 made from conductive material is also used as electric signal radiating antenna 401, the real handwriting stylus is the second electromagnetic and capacitive dual mode stylus 115;

If the driver circuit 106 both provides the electromagnetic output coils 501 and the electric signal radiating antenna 401, and it output electromagnetic signals and electrical signals, the nib 303 made from conductive material is also used as electric signal radiating antenna 401, meanwhile another section of electric conductor is also used as electric signal radiating antenna and connected with the nib 303, the real handwriting stylus is the third electromagnetic and capacitive dual mode stylus 116.

Example 2

The present embodiment provides a real handwriting electromagnetic touch device including the electromagnetic mode stylus 110 and the electromagnetic touch module described in example 1, the electromagnetic touch module includes electromagnetic touch inductor 501 and the electromagnetic touch processor 901.

FIG. 2.1 shows a structure diagram of the electromagnetic touch device of the present embodiment, the external portion of the real handwriting stylus is packaged with the stylus shell, a battery 601 and the stylus system circuit 100 are arranged inside the stylus housing rear-end 701, a function key 105 connected with stylus system circuit 100 is arranged outside of the stylus housing rear-end, touch pressure-sensitive components 300 are arranged inside the stylus housing rear-end 702, the electromagnetic signal output coils 501 are arranged around the nib 303; the electromagnetic touch processor 901 is included in the electromagnetic touch inductor 505, it receives the electromagnetic signals from the real handwriting stylus.

FIG. 2.2 shows a circuit diagram of the electromagnetic touch device of the present embodiment, it includes circuits of the electromagnetic mode stylus 110 and the electromagnetic touch module circuit described in example 1, electromagnetic touch inductor antenna unit 503 of the electromagnetic touch inductor 505 of the electromagnetic touch module receives alternating electromagnetic signals generated by electromagnetic module stylus via the electromagnetic output coils 501, then the alternating electromagnetic signals are converted to electromagnetic induced signals and input into the electromagnetic touch processor 901, and demodulate the signals to signals recognized by an external device by the electromagnetic touch processor 901 and output to the external device, the external device can be the electromagnetic touch inductor 505 of the touch device, laptop and/or cellphone described in the present embodiment;

Wherein, the signals recognized by the external device include the nib dangling position signals, the handwriting trace signals, the stylus pressure-sensitive signals and/or function key signals;

Wherein, the electromagnetic touch inductor 505 comprises one or more electromagnetic touch inductor antenna unit 503.

Example 3

The first capacitive touch device of the real handwriting described in the present embodiment includes the first capacitive mode stylus 111 and the capacitive touch module described in Example 1, the capacitive touch module includes capacitive touch inductor 405 and capacitive touch processor 801.

FIG. 3.1 shows a structure diagram of the first capacitive touch device of the present embodiment, the external of the real handwriting stylus is packaged with a stylus shell, a battery 601 and a stylus system circuit 100 are arranged inside the stylus housing rear-end 701, a function key 105 connected with stylus system circuit 100 is arranged outside of the stylus housing rear-end, touch pressure-sensitive components 300 are arranged inside the stylus housing rear-end 702, the electric signal radiating antenna 401 made from a section of arbitrarily shaped electric conductor is arranged around the nib 303; a capacitive touch processor 801 is included in the capacitive touch inductor 405, it receives the electrical signals output from the real handwriting stylus.

FIG. 3.2 shows a circuit diagram of the first capacitive touch deviceof the present embodiment, it includes circuits of the first capacitive mode stylus 111 and of the capacitive touch module of Example 1, the electric signal radiating antenna 401 of the capacitive touch inductor 405 of the capacitive touch module receives electrical signals generated from the capacitive mode stylus 111 via the electric signal radiating antenna 401, then the electrical signals are converted to field-induced signals and input into the capacitive touch processor 801, and demodulate the signals to signals recognized by an external device by the electromagnetic touch processor 801 and output to the external device, the external device can be the electromagnetic touch inductor 405 of the touch device, laptop and/or cellphone described in the present embodiment;

Wherein, the signals recognized by the external device include the nib dangling position signals, the handwriting trace signals, the stylus pressure-sensitive signals and/or function key signals;

wherein, the capacitive touch inductor 405 comprises one or more capacitive touch inductor antenna unit 403.

Example 4

The present embodiment provides the second capacitive touch device with real handwriting includes the second capacitive mode stylus 112 and the capacitive touch module described in example 1, the difference between the example 3 and the present embodiment is, the nib 303 made from the conductive material is also used as the electric signal radiating antenna 401. FIG. 4.1 shows a structure diagram of the embodiment of the second capacitive touch device of the present invention, and no other electric conductors have been arranged around the nib 303.

FIG. 4.2 shows a circuit diagram of the second capacitive touch device of the embodiment of the invention, and the driver circuit 106 is directly connected with the nib 303 and output electrical signals.

Example 5

The third capacitive touch device with real handwriting includes the third capacitive mode stylus 113 and capacitive touch module described in embodiment 1, the difference between example 3 and the present embodiment is, the nib 303 made from conductive material is also used as the electric signal radiating antenna, and meanwhile another section of electric conductor is also arranged as electric signal radiating antenna 401 and connected with the nib 303. Referring to FIG. 3.1, the circuit of the present embodiment is formed of the electric signal radiating antenna 401 made from electric conductor connected with the nib.

Example 6

The present embodiment provides the first electromagnetic and capacitive dual touch device with real handwriting includes the first electromagnetic and capacitive dual mode stylus 114 and the electromagnetic and capacitive dual touch module described in example 1, and the electromagnetic and capacitive dual module includes an electromagnetic module and a capacitive module. The electromagnetic module refers to Example 2, and the capacitive module refers to example 3.

FIG. 5.1 shows a structure diagram of the first electromagnetic and capacitive touch device of the present embodiment. an electric signal radiating antenna 401 made from a section of arbitrarily shaped electric conductor is added near the nib 303 based on FIG. 2.2 of example 2.

FIG. 5.2 shows a circuit diagram of the first electromagnetic and capacitive touch device of the present embodiment, an electromagnetic touch module is added based on FIG. 3.2 of example 3.

The electromagnetic touch inductor antenna unit 503 of electromagnetic touch module 900 and the capacitive touch inductor antenna unit 403 of the capacitive touch module 800 of the first electromagnetic and capacitive dual mode touch device separately acquires alternating electromagnetic signals and electrical signals.

Upon the electromagnetic touch module of the first electromagnetic and capacitive dual mode touch module is provided on the capacitive touch module, the electromagnetic touch processor 901 transmits capacitive touch module shutdown signal to the capacitive touch processor 801, whereby keeps the electromagnetic touch mode prior.

Upon the capacitive touch module of the first electromagnetic and capacitive dual touch module is provided on the electromagnetic touch module, the capacitive touch processor 801 transmits an electromagnetic touch module shutdown signal to the electromagnetic touch processor 901, whereby keeping the capacitive touch mode prior.

Example 7

The second electromagnetic and capacitive dual touch device with real handwriting provided in the present embodiment includes the second electromagnetic and capacitive dual mode stylus 115 and the capacitive touch module described in the example 1, the deference between example 6 and the present embodiment is the nib 303 made from the conductive material is also used as the electric signal radiating antenna 401. FIG. 6.1 shows a structure diagram of the second electromagnetic and capacitive touch device of the present embodiment, and no other electric signal radiating antenna made from electric conductor has been arranged around the nib 303.

FIG. 6.2 shows a circuit diagram of the second electromagnetic and capacitive touch device of the present embodiment, and the driver circuit 106 directly connected with the nib 303 and output electrical signals.

Example 8

The third electromagnetic and capacitive dual touch device with real handwriting provided in the present embodiment includes the third electromagnetic and capacitive dual mode stylus 116 and the capacitive touch module described in the example 1, the difference between example 3 and the present embodiment is, the nib 303 made from the conductive material is also used as electric signal radiating antenna, and meanwhile another section of electric conductor is also used as the electric signal radiating antenna 401 and connected with the nib 303. Referring to FIG. 3.1, the circuit of the present embodiment is formed of the electric signal radiating antenna 401 made from electric conductor conductive connected with the nib.

The real handwriting stylus and the touch device including real handwriting stylus provided in the present invention accurately and timely generate nib pressure signals and function signals according to the working status, and it is sensitive to receive the nib pressure and the function signals, at last generate the real handwriting of writer real-time.

The above is just preferable example of the present application, rather than the limitation to the present application. For those skilled in the art, the present application can have various of modifications and changes. Any modification, equivalent, and improvement without departing from the spirit and principle of the present application fall into the protection scope of the present application.

What is claimed is:

1. A real handwriting stylus, comprising a stylus shell, a battery inside the stylus shell, a stylus system circuit insides the stylus shell and touch pressure-sensitive components inside the stylus shell, the touch pressure-sensitive components include a nib, a nib touch switch and a nib pressure sensor;

the stylus system circuit includes a charging circuit, a power control and shutdown delay circuit, a power voltage conversion circuit, function keys, a stylus signal generating-modulating circuit and a driver circuit;

the power voltage conversion circuit is connected with the power control and shutdown delay circuit, thereby converting the system power supply into constantly operating supply voltage, the stylus signal generating-modulating circuit is connected with the nib pressure sensor and the function keys, thereby separately obtaining nib pressure signals and function key signals, and modulating and outputting the stylus modulating signals, the driver circuit is connected with a stylus signal generating-modulating circuit to obtain the stylus modulating signal, upon driven and amplified by the driver circuit, outputting electromagnetic signals and/or electrical signals;

the power control and shutdown delay circuit of the stylus system circuit are provided with a power input port connecting with the battery, a power output port connecting with the power voltage conversion circuit, a touch switching signal control port connecting with the nib touch switch;

the touch switching signal control port connects with the touch switch and acquires signals from the touch switch, causing the power input port to be connected with the power output and the stylus system circuit entering a working condition;

wherein if the short circuit conducted signals connected with the touch switch have not been received in the working condition for a long time, the connection between the power input port and the power output port is cut off from each other, and the system circuit enters a shutdown status.

2. The real handwriting stylus according to claim 1, wherein, the nib pressure sensor is a pressure sensitive resistor.

3. The real handwriting stylus according to claim 1, wherein, the nib pressure sensor is a pressure sensitive capacitor.

4. The real handwriting stylus according to claim 1, wherein, the stylus shell includes stylus housing front-end and a stylus housing rear-end;

the battery and the stylus system circuit are arranged inside the stylus housing rear-end, and the stylus housing rear-end is made from metal conductive material;

the touch pressure-sensitive components are arranged inside the stylus housing front-end, and the stylus housing front-end is made from the insulating material.

5. The real handwriting stylus according to claim 1, wherein, the driver circuit connects with an electromagnetic signal output coil and outputs alternating electromagnetic signals, the electromagnetic signal output coil are toroidal coils winded by metal wires with insulating surfaces.

6. The real handwriting stylus according to claim 1, wherein, the driver circuit connects with an electric signal radiating antenna and outputs electrical signals, the electric signal radiating antenna is an electric conductor which is made from a section of conduct materials.

7. The real handwriting stylus according to claim 1, wherein, the driver circuit connects with an electric signal radiating antenna and outputs electrical signals, the nib made from conduct materials is also used as an electric signal radiating antenna.

8. The real handwriting stylus according to claim 1, wherein, the pressures generated by nib touch are transferred to the nib touch switch and the nib pressure sensor.

9. The real handwriting stylus according to claim 1, wherein, the power control and shutdown delay circuit of the stylus system circuit are also arranged a power charging control port connects with the charging circuit, upon the power charging control port have acquired charging signals, the circuit has entered the charging status, the connection between the power input port and the power output port is cut off from each other, and the stylus system circuit is locked on the shutdown status.

10. A touch device, comprising a real handwriting stylus and a touch module; the real handwriting stylus includes a stylus shell, a battery inside the stylus shell, a stylus system circuit insides the stylus shell and touch pressure-sensitive components inside the stylus shell: the power control and shutdown delay circuit of the stylus system circuit are provided with a power input port connecting with the battery, a power output port connecting with the power voltage conversion circuit, a touch switching signal control port connecting with the nib touch switch; the touch switching signal control port connects with the touch switch and acquires signals from the touch switch, causing the power input port to be connected with the power output port and the stylus system circuit entering a working condition; wherein if the short circuit conducted signals connected with the touch switch have not been received in the working condition for a long time, the connection between the power input port and the power output port is cut off from each other, and the system circuit enters a shutdown status; the touch module includes a touch inductor and a touch processor, and receives the electromagnetic signals and/or electrical signals from the real handwriting stylus.

11. The touch device according to claim 10, wherein, the touch module is an electromagnetic touch module, the electromagnetic touch module includes an electromagnetic touch inductor and an electromagnetic touch processor.

12. The touch device according to claim 10, wherein, the touch module is a capacitive touch module, the capacitive touch module includes a capacitive touch inductor and a capacitive touch processor.

13. The touch device according to claim 10, wherein, the touch module is an electromagnetic and capacitive dual module, the electromagnetic and capacitive dual module includes an electromagnetic module and a capacitive module; the electromagnetic module includes an electromagnetic touch inductor and an electromagnetic touch processor, and the capacitive module includes a capacitive touch inductor and a capacitive touch processor.

14. The touch device according to claim 12, wherein, a capacitive touch inductor antenna unit of the capacitive touch inductor receives the electrical signals which are generated by the real handwriting stylus via the electric signal radiating antenna, then the electrical signals are converted to field-induced signals and input into the capacitive touch processor, the capacitive touch processor demodulates the signals to be recognized by an external device and transmits the signals to the external device.

15. The touch device according to claim 11, wherein, an electromagnetic touch inductor antenna unit of the electromagnetic touch inductor of the electromagnetic touch module receives alternating electromagnetic signals generated by the electromagnetic mode stylus via the electromagnetic output coils, then the alternating electromagnetic signals are converted to the electromagnetic inductive signals and input into the electromagnetic touch processor, the electromagnetic touch processor demodulates the signals to be recognized by an external device and transmits the signals to the external device.

16. The touch device according to claim 13, wherein, an electromagnetic touch inductor antenna unit of the electromagnetic touch module in the electromagnetic and capacitive dual module and a capacitive touch inductor antenna unit of the capacitive touch module acquire alternating electromagnetic signals and electrical signals respectively; the electromagnetic touch inductor antenna unit converts the alternating electromagnetic signals into electromagnetic inductive signals, then the electromagnetic inductive signals is input into the electromagnetic touch processor, and the electromagnetic touch processor demodulates the signals to the signals to be recognized by an external device and transmits the signals to the external device; the capacitive touch inductor antenna unit converts the electrical signals into field-induced signals and the field-induced signals is input into the capacitive touch processor, the capacitive touch processor demodulates the signals to the signals to be recognized by an external device and transmits the signals to the external device.

17. The touch device according to claim 16, wherein, the electromagnetic touch module of the electromagnetic and capacitive dual touch module is provided in the rear of the capacitive touch module, the electromagnetic touch processor transmits a shutdown signal of the capacitive touch module to the capacitive touch processor, whereby keeping the electromagnetic touch mode prior.

18. The touch device according to claim 16, wherein, the capacitive touch module of the electromagnetic and capacitive dual touch module is provided in the rear of the electromagnetic touch module, the capacitive touch processor transmits a shutdown signal of the electromagnetic touch module to the electromagnetic touch processor, whereby keeping the capacitive touch mode prior.

19. The touch device according to claim 14, wherein, the signals recognized by the external device include the stylus pressure signals and the of function key signals.

20. The touch device according to claim 14, wherein, the external device is a capacitive touch inductor, an electromagnetic touch inductor, a computer and/or a cellphone.

\* \* \* \* \*